(12) United States Patent
Tischer

(10) Patent No.: US 7,792,279 B2
(45) Date of Patent: Sep. 7, 2010

(54) DISTINGUISHING AUDIO ALERTS

(75) Inventor: Steven N. Tischer, Atlanta, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 674 days.

(21) Appl. No.: 11/669,446

(22) Filed: Jan. 31, 2007

(65) Prior Publication Data

US 2007/0121918 A1    May 31, 2007

Related U.S. Application Data

(63) Continuation-in-part of application No. 11/318,125, filed on Dec. 23, 2005, now Pat. No. 7,558,384, which is a continuation of application No. 10/051,194, filed on Jan. 18, 2002, now Pat. No. 7,013,006.

(51) Int. Cl.
    *H04M 1/00*    (2006.01)
(52) U.S. Cl. .............................. 379/373.02; 379/374.02
(58) Field of Classification Search .............. 379/88.12, 379/252, 352, 372, 373, 374, 418; 455/412.2, 455/567; 340/691, 692
    See application file for complete search history.

(56) References Cited

U.S. PATENT DOCUMENTS

| | | | |
|---|---|---|---|
| 4,508,937 A * | 4/1985 | Burger et al. | .......... 379/373.02 |
| 5,070,521 A | 12/1991 | Warner et al. | |
| 5,493,603 A | 2/1996 | Hirayama | |
| 5,606,597 A | 2/1997 | Newland | |
| 5,797,103 A | 8/1998 | Duda | |
| 5,845,219 A | 12/1998 | Henriksson | |
| 5,870,684 A | 2/1999 | Hoashi et al. | |
| 5,884,200 A | 3/1999 | Yamane et al. | |
| 6,018,654 A | 1/2000 | Valentine et al. | |
| 6,032,053 A | 2/2000 | Schroeder | |
| 6,035,195 A | 3/2000 | Kishida et al. | |
| 6,070,053 A | 5/2000 | Yamshita | |
| 6,075,998 A | 6/2000 | Morishima | |
| 6,094,587 A | 7/2000 | Armanto et al. | |
| 6,122,366 A | 9/2000 | Veschi | ................... 379/373.02 |
| 6,236,858 B1 | 5/2001 | Griffith | |

(Continued)

OTHER PUBLICATIONS

U.S. Appl. No. 11/682,676.*

(Continued)

*Primary Examiner*—Walter F Briney, III
(74) *Attorney, Agent, or Firm*—Woodcock Washburn LLP

(57)    ABSTRACT

Methods, systems, computer program products, and devices distinguish audio alerts emitted from a device. A method involves relating an audio alert and distinctive data associated with an audio alert triggering event to the audio alert triggering event, detecting an occurrence of the audio alert triggering event, altering the audio alert with the distinctive data to generate an altered audio alert associated with the audio alert triggering event, and emitting the altered audio alert from the device in response to detecting the occurrence. The altered audio alert includes a unique instantiation aurally recognizable by a human as having a unique aural fingerprint. Relating the distinctive data may include relating a personal identifier of a person associated with the audio alert triggering event wherein the personal identifier can be, for example, a social security number, an employee identification number, an address, or a birth date. For instance, the ASCII string of a personal identifier can modulate an audio alert.

20 Claims, 6 Drawing Sheets

U.S. PATENT DOCUMENTS

| | | |
|---|---|---|
| 6,246,761 B1 | 6/2001 | Cuddy |
| 6,263,218 B1 | 7/2001 | Kita |
| 6,269,257 B1 | 7/2001 | Cannon et al. |
| 6,285,891 B1 | 9/2001 | Hoshino |
| 6,308,086 B1 | 10/2001 | Yoshino |
| 6,311,896 B1 | 11/2001 | Mulla et al. ............ 235/472.03 |
| 6,332,075 B1 | 12/2001 | Verdonk |
| 6,337,972 B1 | 1/2002 | Jones et al. |
| 6,363,265 B1 | 3/2002 | Ritter |
| 6,366,791 B1 | 4/2002 | Lin |
| 6,496,692 B1 | 12/2002 | Shanahan ................... 455/418 |
| 6,501,967 B1 | 12/2002 | Makela et al. ............... 455/567 |
| 6,535,743 B1 | 3/2003 | Kennedy et al. ......... 455/456.1 |
| 6,549,767 B1 * | 4/2003 | Kawashima ............ 455/412.2 |
| 6,560,466 B1 | 5/2003 | Skorko ...................... 455/567 |
| 6,636,602 B1 * | 10/2003 | Vlacancich ............ 379/374.01 |
| 6,934,747 B1 | 8/2005 | McGrath et al. |
| 7,013,006 B1 * | 3/2006 | Tischer .................. 379/373.02 |
| 7,558,384 B2 * | 7/2009 | Tischer .................. 379/373.02 |
| 7,567,860 B2 * | 7/2009 | Tischer .................. 340/539.13 |
| 2004/0015989 A1 | 1/2004 | Kaizu et al. ................... 725/39 |

OTHER PUBLICATIONS

U.S. Appl. No. 12/428,966.*
U.S. Appl. No. 11/318,125 (Tischer).
U.S. Appl. No. 11/682,567 (Tischer).
U.S. Appl. No. 11/682,676 (Tischer).

* cited by examiner

DISTINGUISHING AUDIO ALERTS

CROSS-REFERENCE TO RELATED APPLICATIONS

This patent application is a continuation-in-part of U.S. patent application Ser. No. 11/318,125, entitled "PROGRAMMABLE AUDIO ALERT SYSTEM AND METHOD," filed Dec. 23, 2005, now U.S. Pat. No. 7,558,384, and assigned to the same assignee as this application. The aforementioned patent application is expressly incorporated herein by reference. U.S. patent application Ser. No. 11/318,125 is a continuation of U.S. patent application Ser. No. 10/051,194, entitled "PROGRAMMABLE AUDIO ALERT SYSTEM AND METHOD," filed Jan. 18, 2002, issued as U.S. Pat. No. 7,013,006, and assigned to the same assignee as this application.

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

TECHNICAL FIELD

The present application relates to distinguishing audio alerts, such as telephone ring tones. Embodiments of the present invention provide systems, methods, and computer program products for distinguishing audio alerts by utilizing other data elements to change, combine, recombine, or alter audio alerts.

BACKGROUND

With the proliferation of electronic devices, such as wireless telephones, pocket pagers, and other devices that employ audio-based alerts, there are an increasing number of alerts heard in a particular area at a given time. Many conventional wireless telephones have only one ring tone available. Other conventional wireless telephones offer only a limited selection of preprogrammed rings, or audio alerts, by which users can vary the audio alert, for example by selecting from available ring tones. A disadvantage of having only a few different audio alerts available in a device is that many such devices in a group of people emit the same ring tone, causing all who are accustomed to that tone to check their device(s) to see if their device is creating the sound.

Another disadvantage is that conventional audio alert systems do not allow combination of audio alerts or combination of an audio alert(s) with other notification features or data elements to create distinctive, for example "morphed", audio alerts. Another disadvantage of conventional audio-based alert systems is that they do not allow creation of original tone sequences, or unique audio alerts, by users of wireless telephones or other devices. Another disadvantage of such currently available devices is that they do not allow users to associate a unique audio alert with a particular incoming signal. As such, current audio alert systems do not allow users to program customized audio alerts.

Thus, there is a need to provide a greater choice of audio alerts such as for wireless telephones. There is also a need to provide for audio alerts that are created by users of such devices. There is also a need to provide a capability for devices to associate a unique audio alert with a particular incoming signal by which the signal source can be identified.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Methods, systems, computer program products, and devices distinguish audio alerts emitted from a device. A method involves relating an audio alert and distinctive data associated with an audio alert triggering event to the audio alert triggering event also referred to as a trigger, detecting an occurrence of the audio alert triggering event, altering the audio alert with the distinctive data to generate an altered audio alert associated with the audio alert triggering event, and emitting the altered audio alert from the device in response to detecting the occurrence. The altered audio alert is a unique instantiation aurally recognizable by a human as having a unique aural fingerprint. Relating the distinctive data may include relating a personal identifier of a person associated with the audio alert triggering event wherein the personal identifier can be, for example, a social security number, an employee identification number, an address, or a birth date. For instance, the ASCII string of a personal identifier can modulate an audio alert in consistent ways so that humans, such as users of devices, including wireless telephones, would get used to unique modulated or morphed audio alerts.

Audio alerts can be programmed using different devices and in various formats. In one embodiment, audio alerts are programmed with a keypad. The device can comprise a wireless telephone, and audio alerts can be programmed with a keypad on the wireless telephone. In an embodiment of the present invention, an audio alert comprises a sequence of numbers in which each number represents a distinct musical tone. In other embodiments, audio alerts are programmed with a personal computer.

A device according to an embodiment of the present invention can include a capability to transmit audio alerts to another device capable of storing and emitting the audio alerts. In addition, such a device further includes a capability to transmit a user-programmed data structure to another device so that when the other device detects an occurrence of the audio alert triggering event, the other device emits the audio alert related to the triggering event. Embodiments of the present invention also include devices capable of receiving from another device, audio alerts, user-programmed data structures related to particular audio alert triggering events, and audio alert triggering events, or signals.

In embodiments of this system, an audio alert triggering event has a capability of modulating an audio alert according to an external variable. Such an external variable can comprise global positioning information, including relative distance information and/or directional information. In other embodiments, the external variable comprises retail information, such as price information.

Embodiments of the present invention also include a method of users programming audio alerts comprising creating an audio alert; providing a device capable of storing and emitting the audio alert; storing the audio alert in the device; and programming in the device a data structure relating the audio alert with an audio alert triggering event. When the device detects an occurrence of the audio alert triggering event, the device emits the audio alert related to the triggering event. Embodiments of methods also include creating a plurality of audio alerts; selecting one of the plurality of audio alerts; and programming the data structure to relate the selected audio alert with the audio alert triggering event.

Embodiments of the present invention also include a user-programmable device for emitting an audio alert comprising a storage capacity; an audio alert created by a user and stored in the device; a user-programmed data structure that relates the audio alert with an audio alert triggering event and is stored in the device; and a capability of emitting the audio alert. When the device detects an occurrence of the audio alert triggering signal, the device emits the audio alert related to the event.

Features of a user-programmable audio alert system, method, and device may be accomplished singularly, or in combination, in one or more of the embodiments of the present invention. As will be appreciated by those of ordinary skill in the art, embodiments of the present invention have wide utility in a number of applications as illustrated by the variety of features and advantages discussed herein.

A user-programmable audio alert system, method, and device according to embodiments of the present invention provide numerous advantages over prior audio alert systems. For example, embodiments advantageously provide a system that allows creation of unique audio alerts by users, rather than limiting a user to one, or a few, pre-programmed audio alert(s) in a device.

Another advantage is programming a user-selected audio alert to emit when a device detects an occurrence of a particular audio alert trigger or triggering event. As such, users can customize audio alerts that are easily recognizable and that are associated with a triggering event from a particular device.

Another advantage is a simple and easy means for creating audio alerts by use of a standard numeric keypad, such as a standard telephone keypad. In addition, embodiments of the present invention allow users to create audio alerts with a sequence of numbers from a keypad in which each number represents a distinct musical tone. Embodiments also allow users to associate triggering events to distinct components within rich media frameworks such as MPEG4, a graphics and video compression algorithm standard that is based on MPEG-1 and MPEG-2 and Apple QuickTime technology. MPEG4 is from a family of digital video compression standards and file formats developed by the Moving Picture Experts Group (MPEG). For example, specific trigger components can be correlated with parts of a rich media framework, such as audio profiles, to control acoustical properties created at the target end at the time of instantiation. These audio profiles may include the aural rendering of natural and synthetic sounds.

Additionally, the aural renderings thus, instantiated can include a subset of a larger instantiated framework such as a visual scene. This allows a wider range of aural alerting by creating sound changes in a specific consumer context including audio parts of visual renderings possibly relative to a user's current conditions. Embodiments can include the modulation of parts of a video scene along with audio changes. Other more subtle changes in output can also be created, such as the redistribution of audio spatialization of the instantiated sounds so that sounds appear to be coming from a particular spatial location.

Embodiments also provide the advantage of readily available means for programming and storing audio alerts using a wireless telephone.

Embodiments allow programming of audio alerts in various formats, including standard Musical Instrument Digital Interface (MIDI) format. Such format flexibility provides the advantage of having a wide range of content available for creating unique audio alerts for instance, by modulating on external variables such as distance and/or direction thereby implementing dynamic sonorous feedback or aural radar.

Another advantage is the transmission of audio alerts for use with other devices. Format interchangeability allows use of audio alerts created in one format to be transmitted and used in a different format with another device.

Still another advantage is the capability of modulating audio alerts according to an external variable, including position, distance, and/or direction relative to another device or location. Embodiments of the present invention also provide for beneficial modulation of external variables such as retail and/or information.

Still another advantage is that embodiments of the present invention can be used in a variety of applications, including with wireless telephones, electronic mail, other messaging systems, bar code scanners, and other systems using audio alerts.

Yet another advantage is that the embodiments of the present invention provide interest to consumers in personalizing communications systems and electronic equipment.

As will be realized by those of skill in the art, many different embodiments of an audio alert system, method, computer program product, and device according to the present invention are possible. Additional uses, objects, advantages, and novel features of the invention are set forth in the detailed description that follows and will become more apparent to those skilled in the art upon examination of the following or by practice of the invention.

DETAILED DESCRIPTION

FIGS. 1-5 show various aspects of embodiments of the present invention. One embodiment comprises an audio alert system, for example a user-programmable audio alert system, that allows a user to create audio alerts from a standard numeric keypad, such as on a wireless telephone, and to program the telephone to emit a selected audio alert when the telephone receives a particular signal. FIG. 1A shows one such embodiment.

Figure 1A:
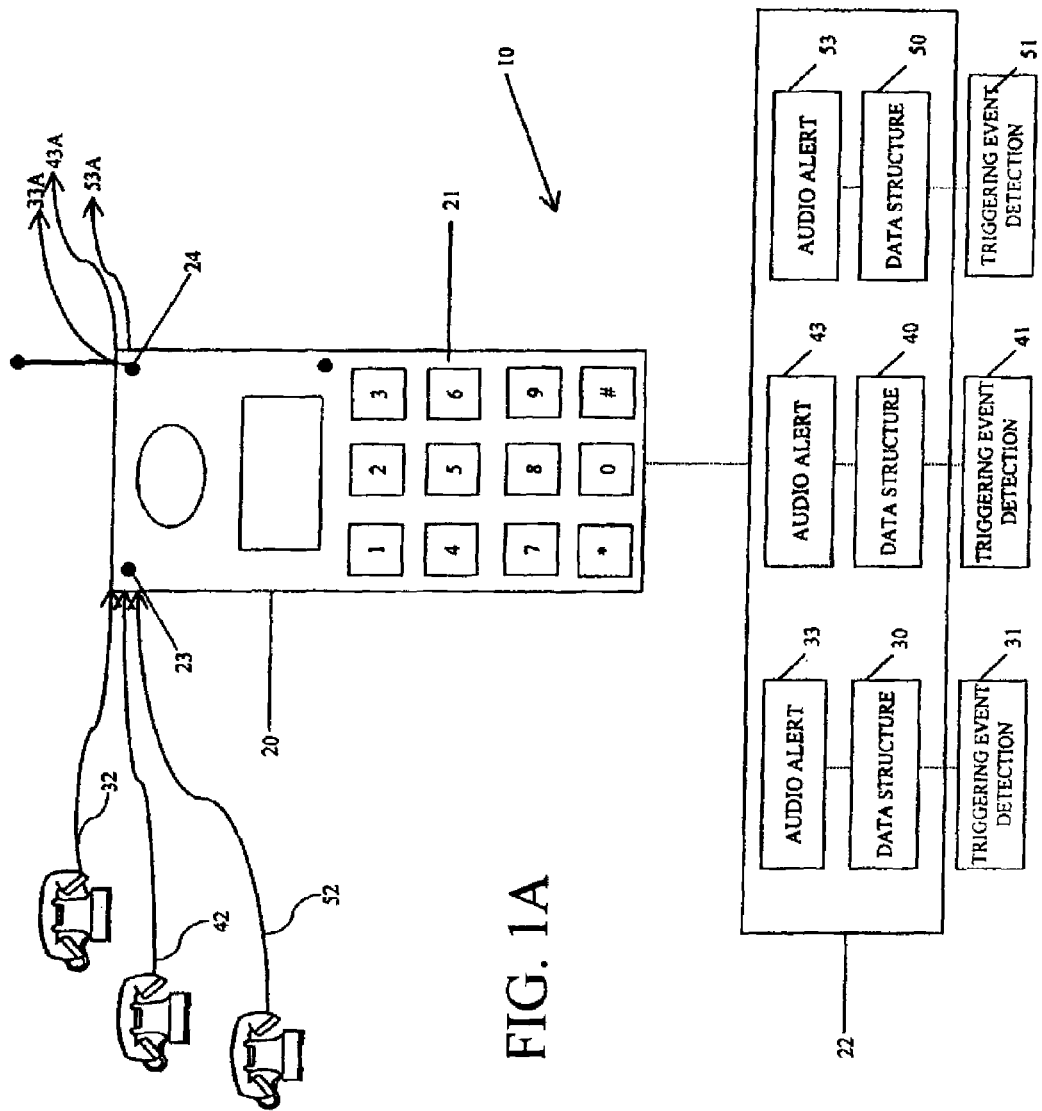
FIGS. 1A and 1B are illustrations of an audio alert system and audio alert computing device architecture in an embodiment of the present invention.

Referring to FIG. 1A, audio alert system 10 includes a wireless telephone 20 having a standard numeric keypad 21 and a storage capacity 22 for storing data, for example in a nonvolatile memory. Wireless telephone 20 includes a receiver 23 capable of receiving incoming signals. Signaling is utilized in a telecommunications system to perform call-handling functions. For example, signaling includes the process of generating and exchanging information among components of a telecommunications system to establish, monitor, or release connections. Alerting, light emitting or ringing, signals notify users or equipment of some occurrence, such as an incoming call. An alerting signal is initiated by pressing appropriate dialing keypads on a call-originating telephone to generate a dual-tone multiple frequency (DTMF) address signal. A DTMF address signal utilizes combinations of frequencies that represent digits or characters to create the unique telephone number address to which the ringing signal of an incoming telephone call is transmitted. In FIG. 1, the receiver 23 is capable of receiving alerting, light emitting or ringing, signals that notify the wireless telephone 20 of an incoming call from the particular call-originating telephone number.

Wireless telephone 20 also includes an emitter 24 for emitting ringing signals, or audio alerts. An audio alert comprises the sound emitted from a device when the device detects an occurrence of a particular triggering event or trigger. A user of the wireless telephone 20 can create unique audio alerts 33, 43, and 53, for example, by programming with the keypad 21, and stores alerts 33, 43, and 53 in storage 22 of the wireless telephone 20. The wireless telephone 20 can be programmed to emit one of the unique audio alerts 33, 43, and 53 when the wireless telephone 20 detects an occurrence of a triggering event.

In other embodiments, audio alerts are provided for storage, retrieval, and use in various functional data components, such as in a data structure, array, list, and file. A functional data component provides an interface between an audio alert triggering event, an audio alert, distinctive data associated with the triggering event, and a device. A user can program a data structure, for example, to relate the detection of an occurrence of a predetermined audio alert triggering event to a particular audio alert, and to cause a device in which the data structure is stored to emit the audio alert when the triggering event is detected. An example of an audio alert triggering event is a ringing signal originating from a particular telephone number. Another example of an audio alert triggering event is an electronic mail message received from a particular computer network address. In embodiments of the present invention, a user can program a data structure to relate an occurrence of a particular audio alert triggering event to an audio alert pre-programmed in a device by the manufacturer or to an original audio alert created by the user. Triggering events are collected or created by programming a device to store certain events as triggers for distinctive audio alerts.

In an embodiment as shown in FIG. 1A, data structure 30 is programmed to relate a detection 31 of an occurrence of audio alert triggering event 32 to audio alert 33. When wireless telephone 20 detects an occurrence of audio alert triggering event 32, data structure 30 causes emitter 24 to emit an iteration 33A of audio alert 33. In like fashion, data structure 40 relates or associates a detection 41 of an occurrence of audio alert triggering event 42 to audio alert 43. When wireless telephone 20 detects an occurrence of audio alert triggering event 42, data structure 40 causes emitter 24 to emit an iteration 43A of audio alert 43. Similarly, data structure 50 relates a detection 51 of an occurrence of audio alert triggering event 52 to audio alert 53, such that when wireless telephone 20 detects an occurrence of audio alert triggering event 52, data structure 50 causes emitter 24 to emit an iteration 53A of audio alert 53. While FIG. 1A shows three instances of a data structure relating detection of an audio alert triggering event to an audio alert in a device, embodiments of the present invention include more than three audio alerts, for example programmed in a device, and more than three data structures relating detection of particular audio alert triggering events to outputs, sequences, and/or prefabricated audio alerts.

As an example of the operation of the audio alert system in FIG. 1A, a user of wireless telephone 20 programs data structure 40 to relate detection 41 of audio alert triggering event 42, which, by way of example, is the ringing signal from the user's home telephone number, to audio alert 43. When a call is made to wireless telephone 20 from the user's home telephone, wireless telephone 20 detects audio alert triggering event 42. Data structure 40 then causes wireless telephone 20 to emit the iteration 43A of audio alert 43. Because audio alert 43 is uniquely related to calls from the user's home telephone number, the user is able to auditorily identify that the call received on wireless telephone 20 originated from her home telephone.

While the embodiment in FIG. 1A shows that a user can create, or program, audio alerts using keypad 21 on wireless telephone 20, audio alerts can also be programmed using keypads on other data entry devices, for example a bar code scanner used with a check-out register. In other embodiments, audio alerts are created with one device and transmitted to another device for storage and use. For example, audio alerts can be programmed on one telephone and transmitted to another telephone for storage and use. Audio alerts can also be created using a personal computer and then uploaded to another device, such as a wireless telephone 20. In alternative embodiments, audio alerts are stored on a computer network server and may be accessed and used with multiple devices.

Audio alerts can be programmed, stored, and transmitted in various formats. For example, audio alerts can be created using a Musical Instrument Digital Interface (MIDI) format. MIDI is an interface that enables a personal computer to send and receive messages for the purpose of creating music, sound, or lighting. In another format, an audio alert comprises a sequence of numbers programmed using a keypad, wherein the numbers represent musical notes. In other embodiments, audio alerts are created, stored, and transmitted in MP3 format. MP3 is a Moving Picture Expert Group (MPEG) standard comprising a digital audio compression algorithm used especially for digitally transmitting music over a computer network, such as the Internet. In still other embodiments, audio alerts are programmed using a unique audio alert protocol format.

In embodiments of the present invention, audio alerts can be created, saved, and transmitted in one format and converted to a different format for use. For example, an audio alert programmed to play a Bach piece in a unique audio alert protocol could be transmitted to another device and converted into a MIDI format and played with different instruments. Audio alerts can be created and transmitted using a pulse-based format or a tone-based format, such as dual tone multiple frequency (DTMF). DTMF is a dialing method which utilizes tones to represent numbers for the dialing procedure. Such format interchangeability of audio alerts allows use of the audio alerts in any device with the proper interface, and thus flexibility in a variety of applications including trigger treatment.

In embodiments of the present invention, audio alerts comprise content in various formats that may be pre-existing, including professionally created content, and/or created by a user. Content may also include, but is not limited to, melodies, performances, ring tones, song excerpts, and digital recordings. As an example, a user may program an audio alert using the first bar of Beethoven's Ninth Symphony. Alternatively, an audio alert may comprise a digital recording of a user's spouse saying "It's me!" Audio alerts can be customized to include a combination of pre-existing and user-created content. For example, a user could customize an audio alert by combining the first bar of Beethoven's Ninth Symphony and a digital recording of a user's spouse saying "It's me!"

Embodiments of the present invention include audio alert triggering events that are detected by a device, such as the wireless telephone 20 in FIG. 1A. Audio alert triggering events comprise various forms and may be transmitted in different modes, depending on the design and detection capabilities of a receiving device. One example of an audio alert triggering event is a ringing signal originating from a particular telephone number. A ringing signal using a DTMF format is a typical call notification modality utilized in a telecommunications system. Another example of an audio alert triggering event is an electronic mail message received from a particular computer network address. In this instance, an audio alert triggering signal can be transmitted digitally along with the electronic mail message. In embodiments, audio alert triggering events, or signals, are transmitted between devices as data embedded within a primary message, as tags in a transmission language, and utilizing other suitable means, such as, for example, radio frequency and infrared transmissions.

Audio alerts can be combined with other audio alerts and/or with other notification features. The data structure can relate the audio alerts to distinctive data associated with the particular triggering event. The distinctive data is utilized by the device to distinguish the audio alert in consistent ways so that humans, such as users of devices, including wireless telephones, would get used to unique altered, modulated, or morphed audio alerts. For example, an original audio alert tone sequence could be combined with a commonly available audio alert tune to create a distinctive "morphed" audio alert. Also, a short voice recording could be added to a distinctive audio alert.

Figure 1B:
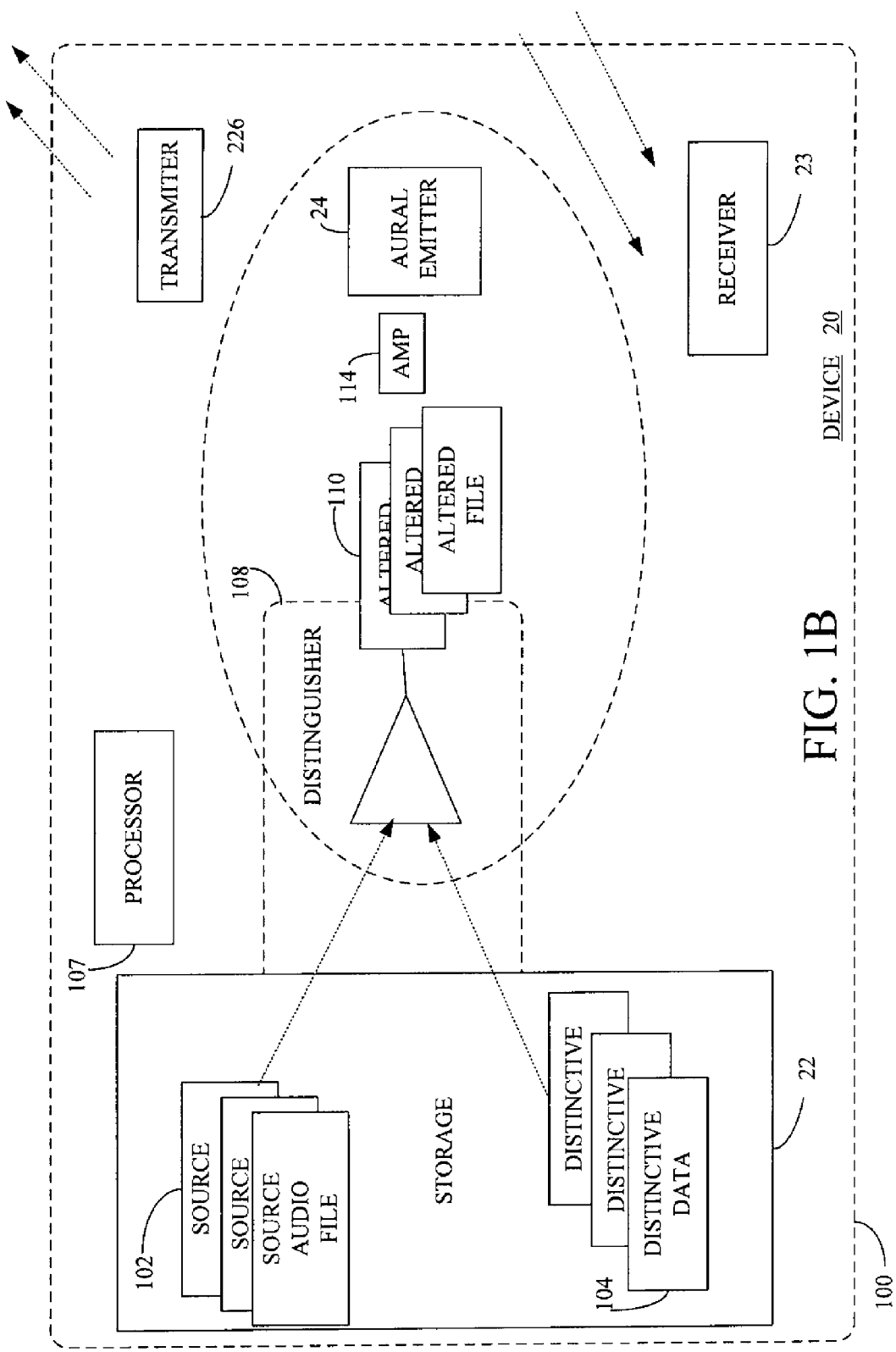

Referring to FIG. 1B, audio alert computing device architecture 100, according to an embodiment of the present invention, will be described. The computing device architecture 100 includes the receiver 23 and the audio alerts of FIG. 1A represented as source audio files 102 associated with distinctive data files 104, both of which reside in the storage 22. It should be appreciated that the audio files 102 and the distinctive data files 104 may reside externally to the device 20. The audio files 102 are source electronic files interpretable as audio and the distinctive data files 104 are electronic files containing data usable as distinctive data. Distinctive data may include, but is not limited to, a personal identifier of a person associated with the audio alert triggering event, a digital voice recording of the person, and a digital recording associated with the audio alert triggering event, such as a siren recording for use in an emergency triggering event.

Personal identifiers may include, but are not limited to, a social security number, a zip code, an address, an employee identification number, a phone number, a birth year, and/or a birth date. A distinguisher 108, for example a modulator, causes a processor 107 to change, modulate, morph, and/or alter the source audio files 102 utilizing the distinctive data files 104. For instance the distinguisher 108 can modulate one or more of the source audio files 102 with an ASCII string of a personal identifier to generate one or more altered audio files 110. It should be appreciated that modulating the audio alert with an ASCII string of the personal identifier may also include adding two or more digits of the ASCII string and using the sum to modulate the audio alert, subtracting two or more digits of the ASCII string and using the difference to modulate the audio alert, dividing two or more digits of the ASCII string and using the result to modulate the audio alert, and/or multiplying two or more digits of the ASCII string and using the product to modulate the audio alert.

Still further, unique or altered audio alerts can be generated by using combinations of triggers and existing outputs as modulators. For example, a home phone number trigger may be used in conjunction with the source audio files 102 to generate a unique audio alert. Alert data structures may also be modulated by structures derived from triggers. Multiple triggers, for example a phone number and a distance parameter may be recombined together to generate a unique audio alert. In the alternative, the recombination compound may be used to modulate an existing aural recipe. Aural recipes can be stored for later instantiation, optionally transmitted to others, and/or instantiated and then stored and transmitted to others.

An example of an aural recipe may include an audio source file containing a ring tone for the first four notes of Beethoven's 5th symphony. For instance, the aural recipe could be applied to an incoming call from a directory number, 404-555-1212, to utilize the directory number to create a single modulation modifier as follows:

For the first three notes of the ring tone:
   Add the first group of three numbers to get 8;
   Add the second group of three numbers to get 15;
   Add the group of four numbers to get 6;
   Subtract the second group sum from the first group sum and then multiply by the group of four sum to get the result (8−15)×6=−42; and
   Use that result to alter some component of the unaltered ring tone, for example make the first three notes 42/1000ths flat.
For the last note of the ring tone:
   Use the sums above but add the first two and then subtract the last one to get the result (8+15)−6=17; and
   Use that result on the last note in the ring tone to be a vibrato rate.

This aural recipe would alter the traditional Beethoven ring tone in this manner each time a call from the directory number 404-555-1212 is received. It should be appreciated that the same recipe applied to a different phone number would consistently yield a different, distinctive sound. It should also be appreciated that these recipes can be combined with other sensed or known variables, such as blood pressure, weight, bank account balance, and/or the birth date of the caller to modify a ring tone.

The altered audio file 110 is used as the source data for a digital amplifier 114 that emits the altered audio alert through the aural emitter 24. The altered audio file 110 is also a direct distinguishing source for a transmitter 226, as with a carrier-less transmitter in Ultra-Wide Band. The altered files 110 may be transmitted to other devices via the transmitter 226 for use at a distance. Additional details regarding distinguishing audio alerts will described below with respect to FIGS. 3-5.

Figure 2:
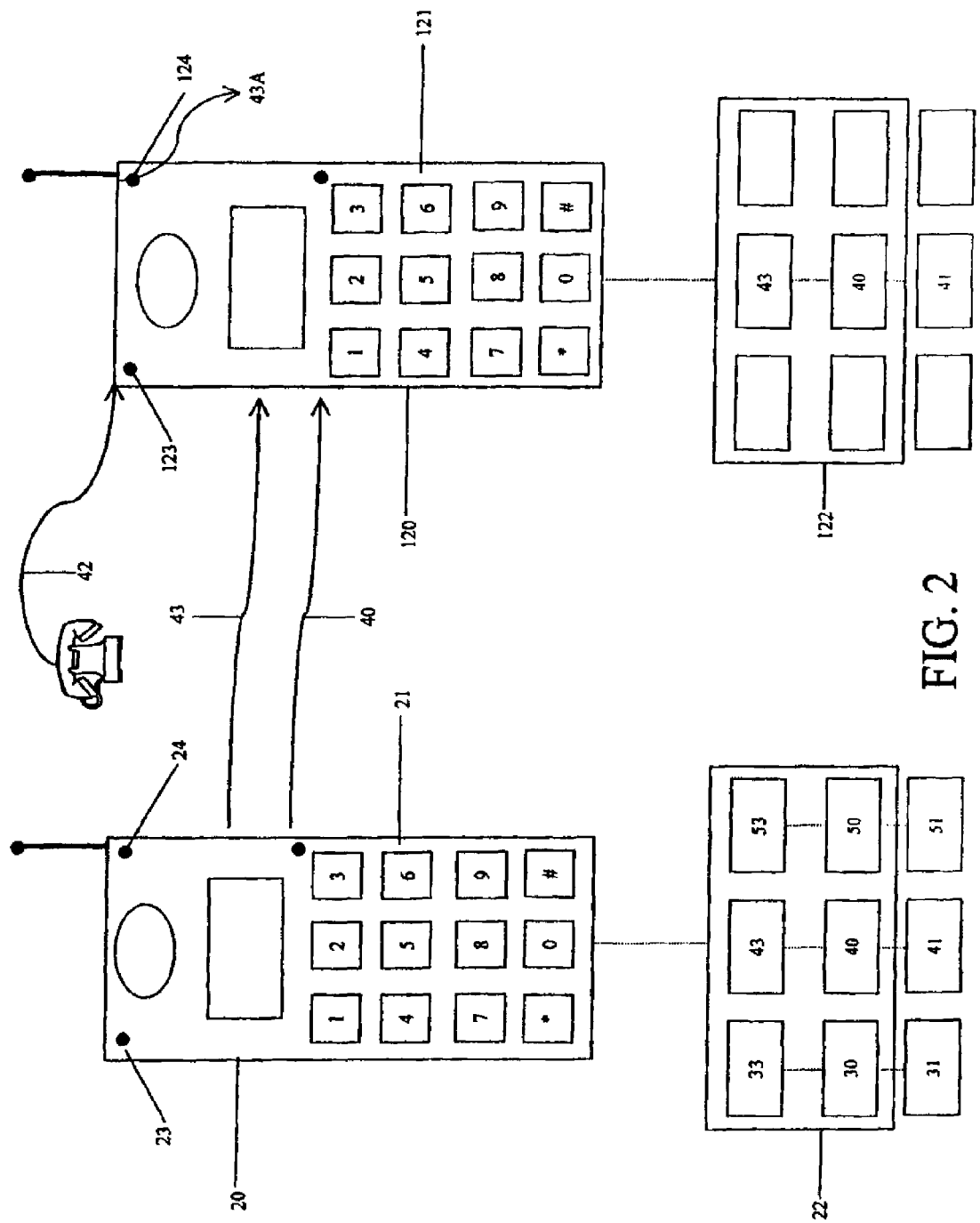
FIG. 2 is an illustration of an audio alert system in another embodiment of the present invention.

In embodiments of the present invention, audio alerts and data structures are exchanged between devices. Referring to FIG. 2, wireless telephone 20 of FIG. 1A has a capability to transmit audio files, such as user-programmed audio alerts 33, 43, and 53, and data structures 30, 40, and 50 to another wireless telephone 120 capable of receiving, storing, and using such transmissions. For purposes of illustration, wireless telephone 120 is similar to wireless telephone 20, and includes a keypad 121, a storage capacity 122 for storing data, a receiver 123 capable of receiving audio alert triggering events, such as ringing signals, and an emitter 124 for emitting audio alerts. In wireless telephone 20, data structure 40 is programmed to relate the detection 41 of an occurrence of audio alert triggering event 42 to audio alert 43. A user transmits audio alert 43 and data structure 40 from wireless telephone 20 to wireless telephone 120. Wireless telephone 120 receives the transmission and stores audio alert 43 and data structure 40 in storage 122. Thereafter, when wireless telephone 120 detects an occurrence of audio alert triggering event 42, data structure 40 causes emitter 124 to emit the iteration 43A of audio alert 43.

Audio alerts can be transmitted to dissimilar wireless telephones and to other types of devices, provided that a receiving device is capable of receiving and storing transmissions of audio alerts. A receiving device may have the same audio alert architecture, for example, software or format, as a transmitting device. However, a receiving device can use a different format, or software, to store and emit audio alerts after receiving audio alert transmissions from another device. In addition, audio alerts can be transmitted between devices in various ways, such as by radio frequency, infrared signal, direct connection, or by other suitable means.

In embodiments of the present invention, audio alerts are associated with particular functions, such as auditorily identifying the originating number of an incoming telephone ringing signal. Another function is auditory identification of a specific sending address of an electronic mail message over a computer network. In addition to such identification functions, audio alerts can be modulated according to an external variable. Modulation is a process of varying certain parameters in a carrier, or base, signal in accordance with the characteristics of another signal, such as an information-bearing, modulating input signal. A base signal can be modulated by changes in amplitude, frequency, phase of a carrier wave or a light wave for the transmission of information (as by radio), or in other characteristics. Audio alerts can be modulated by variables so as to effect changes in duration, intensity, pitch, and/or octaves of the emitted audio alerts. This process can include the use of dynamic data changing a modulation scheme as variable data, such as distance, is received by the device 20. The processor 107 calculates a modulation key based on a changing variable.

Figure 3:
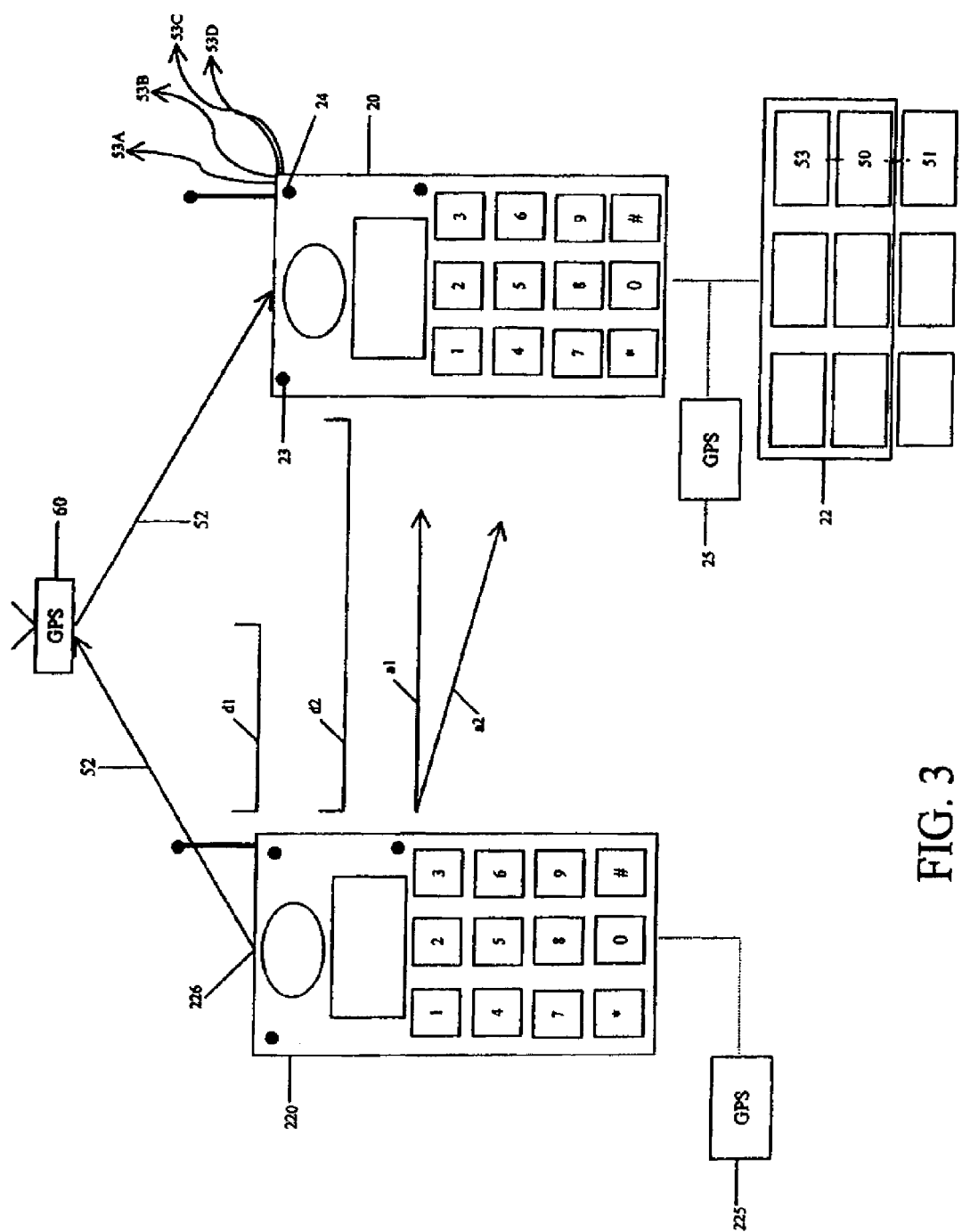
FIG. 3 is an illustration of an audio alert system in still another embodiment of the present invention.

FIG. 3 illustrates an embodiment of such modulation of emitted audio alerts by external variables. In FIG. 3, wireless telephone 220 includes a transmitter 226 for transmitting signals, including audio alert triggering event, or signal, 52. Wireless telephone 220 also includes a global positioning system interface 225, which allows receipt and transmission of global positioning information, such as latitude, longitude, and altitude. Wireless telephone 20 includes the receiver 23 for receiving incoming transmissions, the emitter 24 for emitting audio alerts, and storage 22 having audio alert 53 and data structure 50 stored therein. Data structure 50 is programmed to relate detection 51 of an occurrence of audio alert triggering event 52 to audio alert 53, such that when wireless telephone 20 detects an occurrence of audio alert triggering event 52, data structure 50 causes emitter 24 to emit the iteration 53A of audio alert 53. Wireless telephone 20 also includes a global positioning system (GPS) interface 25. When wireless telephone 220 is a distance d1 from wireless telephone 20, wireless telephone 220 transmits audio alert triggering signal 52 to wireless telephone 20 via global positioning system 60. Upon receiving audio alert triggering signal 52 from wireless telephone 220 at distance d1, wireless telephone 20 detects audio alert triggering signal 52, and data structure 50 causes emitter 24 to emit iteration 53A of audio alert 53 to indicate the relative distance d1 between the positions of the two wireless telephones 20 and 220.

As wireless telephone 220 moves from distance d1 to distance d2 relative to wireless telephone 20, wireless telephone 220 transmits audio alert triggering signal 52 to wireless telephone 20 via global positioning system 60. Upon receiving audio alert triggering signal 52 at distance d2, wireless telephone 20 detects audio alert triggering signal 52, and data structure 50 causes emitter 24 to emit iteration 53B of audio alert 53 to indicate the new relative distance d2 between the positions of the two wireless telephones 20 and 220. Iteration 53B of audio alert 53 emitted from wireless telephone 20 is a modulated variation of iteration 53A of audio alert 53, indicating a change in relative distance between the two wireless telephones 20 and 220. Thus, audio alert 53 is modulated by the external variable of distance between the two wireless telephones 20 and 220. Transmission of audio alert triggering signal 52 from wireless telephone 220 can be continuous as wireless telephone 220 moves in position from distance d1 to distance d2 relative to wireless telephone 20. During such movement, modulation of iterations of audio alert 53 emitted by wireless telephone 20 changes, becoming louder or more rapid, for example, indicating continuing changes in relative distance between the two wireless telephones 20 and 220.

Another variable by which audio alerts can be modulated using global positioning information is directional movement. As shown in FIG. 3, when wireless telephone 220 is positioned at a direction, or angle, a1 from wireless telephone 20, wireless telephone 220 transmits audio alert triggering signal 52 to wireless telephone 20 via global positioning system 60. Upon receiving audio alert triggering signal 52 from wireless telephone 220 at directional, wireless telephone 20 detects audio alert triggering signal 52, and data structure 50 causes emitter 24 to emit iteration 53C of audio alert 53 to indicate the relative direction a1 between the positions of the two wireless telephones 20 and 220.

As wireless telephone 220 moves from direction a1 to direction a2 relative to wireless telephone 20, wireless telephone 220 transmits audio alert triggering signal 52 to wireless telephone 20 via global positioning system 60. Upon receiving audio alert triggering signal 52 from wireless telephone 220 at direction a2, wireless telephone 20 detects audio alert triggering signal 52, and data structure 50 causes emitter 24 to emit iteration 53D of audio alert 53 to indicate the new relative direction a2 between the positions of the two wireless telephones 20 and 220. Iteration 53D of audio alert 53 emitted from wireless telephone 20 is a modulated variation of iteration 53C of audio alert 53, indicating a change in relative direction between the two wireless telephones 20 and 220 from direction a1 to direction a2. Thus, audio alert 53 is modulated by the external variable of direction between the two wireless telephones 20 and 220.

As with changing relative distance, transmission of audio alert triggering signal 52 from wireless telephone 220 can be continuous as wireless telephone 220 changes from direction a1 to direction a2 relative to wireless telephone 20. During such movement, modulation of audio alert 52 emitted by wireless telephone 20 changes, becoming louder or more rapid, for example, indicating continuing changes in relative direction between the two wireless telephones 20 and 220.

Modulation of audio alerts according to external variables has practical applications, such as being able to rapidly determine the proximity of another device or a person with a device. As in the embodiment in FIG. 3, for example, modulating audio alerts in a first device, based on the calculated distance of the first device from a second device using GPS data, allows real-time notification of movement between the two devices. As the second device moves relative to the first device, the audio alert changes correspondingly. Such an embodiment is useful for finding someone in close proximity, but not easily seen, as in a crowd. In addition, such a system can be used to identify the relative distance from more than one person. For example, if a distinctive audio alert is programmed into a device for devices transported by each of several people, for example children in a family for dynamic child monitoring, the distinctive audio alert for each device (and person) would change as that person's position changes relative to the monitoring device. As such, a parent could monitor each child's relative distance, and movement, from the parent.

Figure 4:
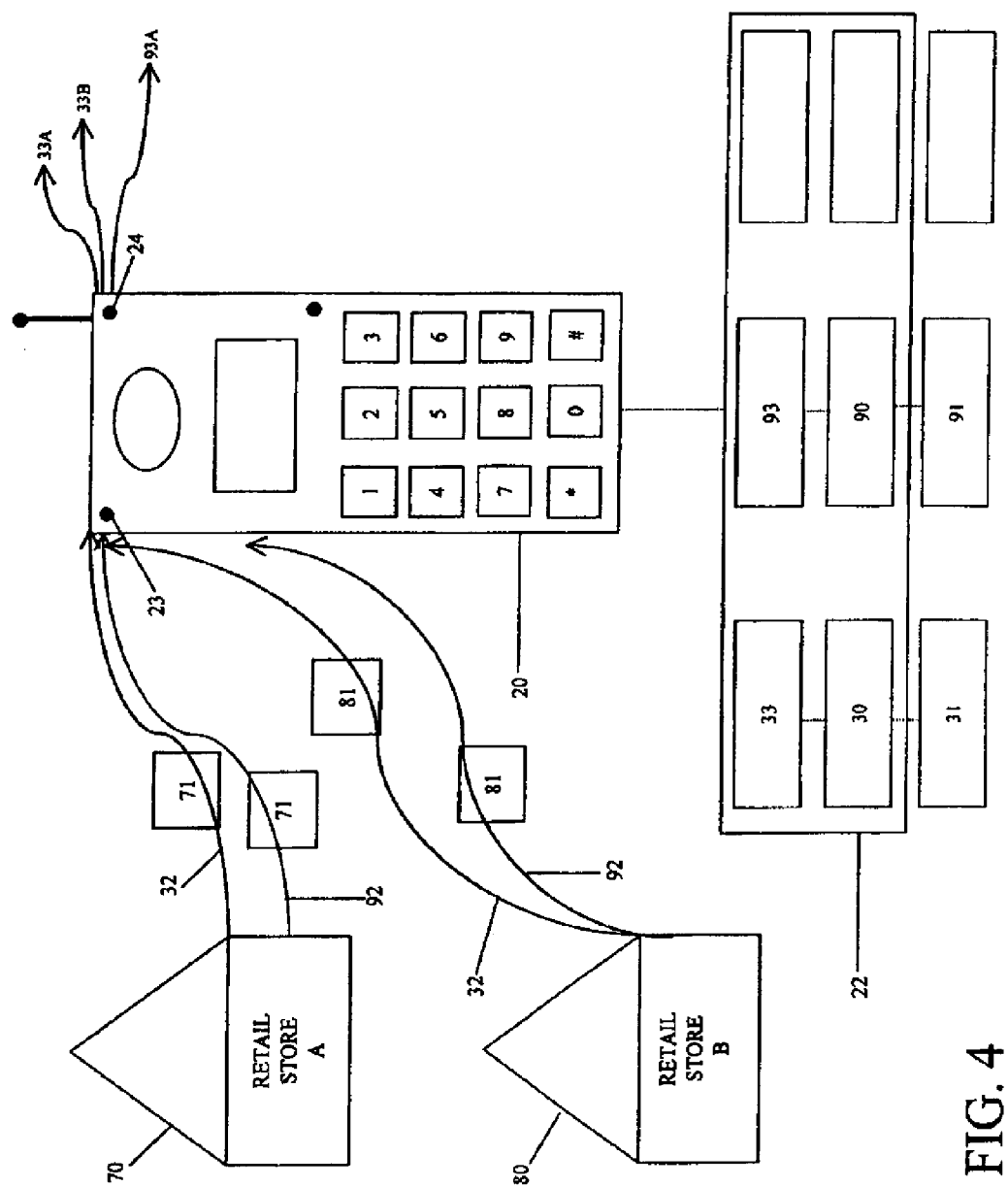
FIG. 4 is an illustration of an audio alert system in still another embodiment of the present invention.

FIG. 4 illustrates another embodiment of audio alert modulation by external variables. In FIG. 4, wireless telephone 20 includes a receiver 23 for receiving incoming transmissions, the emitter 24 for emitting audio alerts, and storage 22 having audio alert 33 and data structure 30 stored therein. Data structure 30 is programmed to relate detection 31 of an occurrence of audio alert triggering event, or signal, 32 to audio alert 33. When wireless telephone 20 detects an occurrence of audio alert triggering event 32, data structure 30 causes emitter 24 to emit the iteration 33A of audio alert 33. Wireless telephone 20 and receiver 23 are adapted to receive transmissions carrying retail information. Such retail information may include, for example, proximity to a particular type of retail store, availability of a particular retail item, price range, and relative price data. A device may be activated to receive price information for a product from a particular retail store, for example by pointing the device toward the store.

As an example of audio alert modulation by retail information, audio alert triggering signal 32 comprises the price for a selected product. Data structure 30 is programmed to detect audio alert triggering signal 32, and in particular the price of the selected product carried with the audio alert triggering signal 32. When wireless telephone 20 is activated to receive price information for the selected product from retail store A (70), audio alert triggering signal 32 carrying price information 71 is transmitted from retail store A (70) for that product to the wireless telephone 20. Upon receiving audio alert triggering signal 32 and price information 71 from retail store A (70), wireless telephone 20 detects audio alert triggering signal 32, and data structure 30 causes emitter 24 to emit iteration 33A of audio alert 33 to indicate price 71.

Wireless telephone 20 is then activated to receive price information for the same product from retail store B (80). Audio alert triggering signal 32 carrying price information 81 is transmitted from retail store B (80) for that product to the wireless telephone 20. Upon receiving audio alert triggering signal 32 and price information 81 from retail store B (80), wireless telephone 20 detects audio alert triggering signal 32, and data structure 30 causes emitter 24 to emit iteration 33B of audio alert 33 to indicate price 81 relative to price information 71. Audio alert 33B is a modulated variation, for example varied in pitch or frequency, of audio alert 33A, indicating a relative price difference between product price information 81 for retail store B (80) and product price information 71 for retail store A (70).

In embodiments, modulation of audio alerts according to price information can be customized. For example, an audio alert can be programmed to modulate upon receipt of price information from a retail store relative to a predetermined price to indicate, for example, prices higher or lower than a given price range. Using such a system, a customer can quickly and easily compare prices for a product in different retail stores. Alternatively, audio alerts can be programmed to include brand and/or advertising information, for example, to indicate presence of a particular brand of item.

In the embodiment shown in FIG. 4, audio alert triggering signal 92 comprises the price for a selected product. Data structure 90 is programmed in wireless telephone 20 to detect whether a price for the selected product carried on audio alert triggering signal 92 falls within a pre-determined price range. When wireless telephone 20 is activated to receive price information for the selected product from retail store A (70), audio alert triggering signal 92 carrying price information 71 is transmitted from retail store A (70) for that product to the wireless telephone 20. Upon receiving audio alert triggering signal 92 and price information 71 from retail store A (70), wireless telephone 20 detects audio alert triggering signal 92. The price 71 of the selected product in retail store A (70) falls within the pre-determined price range programmed in data structure 90, and data structure 90 causes emitter 24 to emit iteration 93A of audio alert 93 to indicate that price 71 falls within the pre-determined range. If price 71 did not fall within the price range programmed for detection in data structure 90, no audio alert would be emitted.

Wireless telephone 20 could then be activated to receive price information for the selected product from retail store A (80). If the price 81 fell within the pre-determined price range programmed for detection in data structure 90, iteration 93A of audio alert 93 would be emitted, and if price 81 did not fall within the programmed price range, no audio alert would be emitted. Using such an embodiment of the present invention in this manner, whether a selected product had a price within a programmed range could be determined for multiple retail stores.

In other embodiments, audio alerts are modulated by other programmed variables, such as the time of day. For instance, in a device having an appointment calendar, an audio alert can be programmed to emit at intervals and be modulated to be emitted more loudly as the time of an appointment draws nearer. In addition, a user can select a particular audio alert to be related to such a time-based signal unique to the type of appointment the audio alert is signifying. For example, one user-programmed audio alert could be used to signify appointments inside an office while another user-programmed audio alert could be used to signify appointments outside the office.

As mentioned herein, audio alerts can be programmed in various formats. In one such format, an audio alert comprises a sequence of numbers programmed using a standard numeric keypad, such as on a wireless telephone or other data entry terminal. In an embodiment, numbers on the keypad correspond to relative tones in the musical scale. The number 1 corresponds to middle C, and each higher number represents a half-tone increment, such that 1=C, 2=C#, 3=D, 4=D#, and so on. A total of twelve numbers represent an entire octave. As an example, the musical notes for the song "Happy Birthday" (in the key of C) would be represented by 1 1 3 1 6 5 1 1 3 1 8 6 1 1 (111)10 6 5 3 (11)(11)10 6 8 6. Striking the appropriate key twice in rapid succession represents the corresponding note in the next higher, or second, octave. In like fashion, striking the appropriate key three times in rapid succession represents the corresponding note in the next successively higher, or third, octave. In this example, "(11)" indicates striking the "1" key two times rapidly in succession, similar to double-clicking a computer mouse, and represents the C note in the second octave. Similarly, "(111)" indicates striking the "1" key three times rapidly in succession, and represents the C note in the third octave.

In addition, both note duration and intensity can be varied. For example, the asterisk key (*) could represent duration of notes, so that entering the sequence 1 1 3 * * 1 would make the third note twice as long, and in the above example, would make the resulting tune sound more like the traditional "Happy Birthday" tune. In similar fashion, the pound key (#) can be used to represent note intensity such that entering the # key after a note would make the previous note louder. For example, entering the # key following the sequence 1 1 3 1 6 5 # would make the note represented by "5" the loudest in this sequence. In such embodiments, a standard numeric keypad can be utilized by users to simply and easily program audio alerts.

Figure 5:
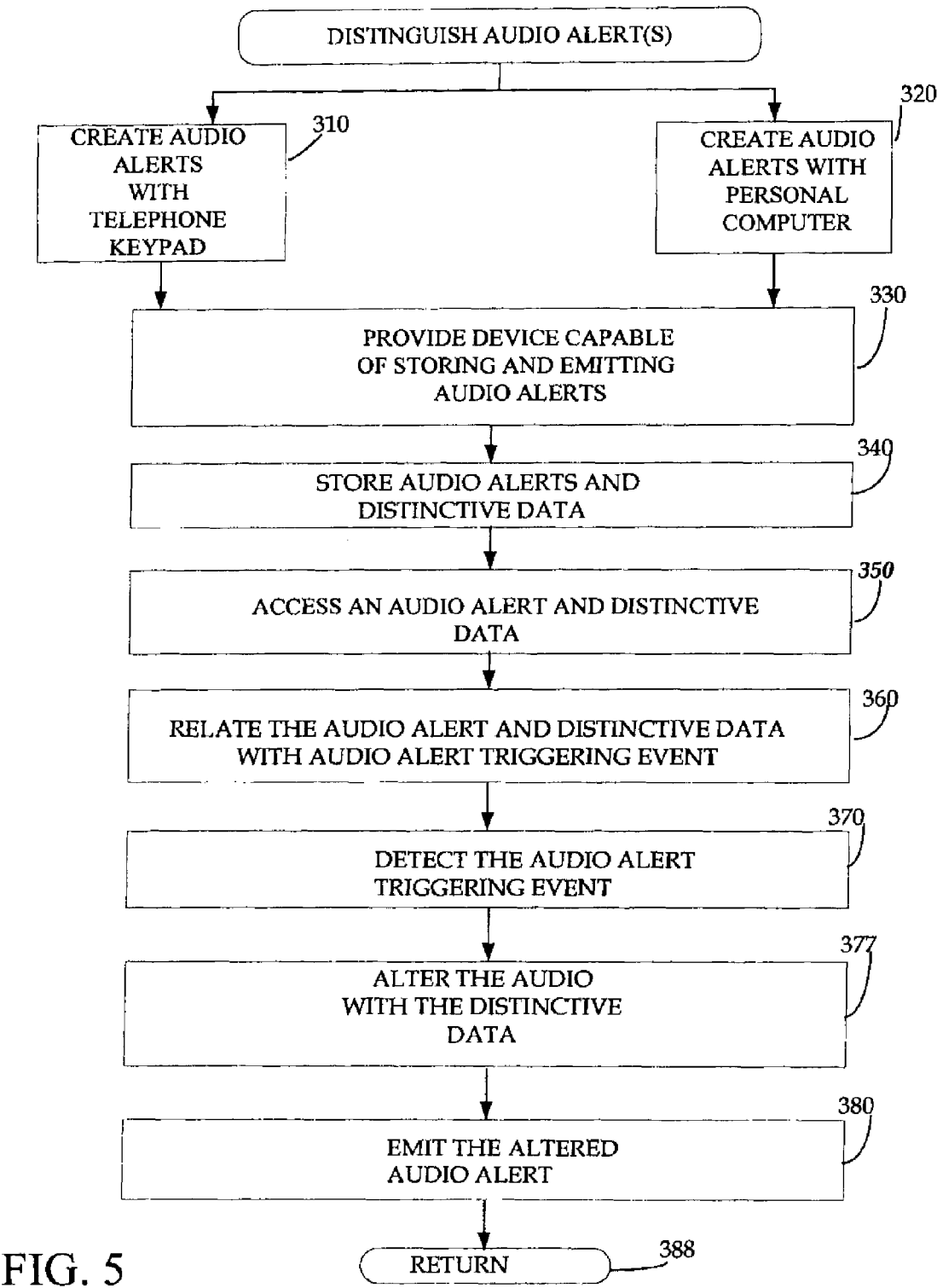
FIG. 5 is an illustrative operational flow performed in distinguishing audio alerts according to an embodiment of the present invention.

The present invention comprises embodiments of methods for distinguishing audio alerts. FIG. 5 shows one such embodiment. As shown in the method 300 in FIG. 5, users can create audio alerts with a wireless telephone keypad (310) or with a personal computer (320). Method 300 includes providing a device capable of storing and emitting audio alerts (330). A user can store audio alerts and distinctive data (340) in the device. The audio alerts and distinctive data may also be stored external to the device. The method 300 accesses one of the audio alerts and the distinctive data (350) and generates in the device a data structure relating the accessed audio alert with, the distinctive data and an audio alert triggering event (360). It should be appreciated that a user or equipment may audition or try out the altered audio alert to hear it prior to emitting the altered audio alert from the device in response to detecting the occurrence.

When the device detects the audio alert triggering event (370), the device alters the audio alert with the distinctive data to generate an altered audio alert associated with the audio alert triggering event (377). The altered audio alert is a unique instantiation aurally recognizable by a human as having a unique aural fingerprint. The device then emits the altered audio alert related to the triggering event in response to detecting the event (380).

In other embodiments of methods, a device modulates audio alerts according to an external variable. Audio alerts are modulated according to external variables such as global positioning information, including distance and direction information, and retail information, such as price information.

In still other embodiments of methods, users program audio alerts comprising a sequence of numbers wherein each number represents a distinct musical tone.

Embodiments of systems and methods include applications in a variety of devices and communication systems. For example, audio alerts can be created, stored, and used in conjunction with wireless telephones, paging devices, dedicated global positioning system devices, and other wireless devices such as personal digital assistants (PDAs). In addition, audio alerts can be utilized with electronic mail message systems in a computer network.

In other embodiments, audio alerts are programmed by users in bar code scanners, such as those used with check-out registers in retail stores. For example, at a supermarket check-out area, bar code scan tones are generally the same for each scanner, making it difficult to discern which register is scanning an item. Using the system and method, unique audio alerts can be created and stored for each register and/or each check-out clerk. For example, each clerk's personal audio alert could be created using a standard number keypad, such as keypads supplied on the register/scanner. A personal identifier, such as the clerk's last name or employee identification number could be automatically used or entered to create the unique audio alert. When the clerk logs in to a cash register/scanner, that particular clerk's unique user-programmed audio alert would be emitted each time an item is scanned by that clerk. As a result of scanning by a clerk producing a personalized audio alert, customers could correlate the scan of an item for purchase with the particular scanner being used by the clerk. In an alternative embodiment, a unique audio alert for each product, product type, and/or brand could be programmed to be emitted when the particular product or product type is scanned.

Although embodiments of the present invention have been described with reference to particular embodiments, it should be recognized that these embodiments are merely illustrative of the principles of the present invention. Those of ordinary skill in the art will appreciate that a user-programmable audio alert system and method of the present invention may be configured and implemented in other ways and embodiments. Accordingly, the description herein should not be read as limiting the present invention, as other embodiments also fall within the scope of the present invention.

What is claimed is:

1. A method for distinguishing audio alerts emitted from a device, the method comprising:
    in the device, detecting receipt of an audio alert triggering event signal comprising an indication of a source of the signal;
    responsive to the detecting, identifying a predetermined relationship between distinctive data, an audio alert, and the source of the signal;
    storing the audio alert and the distinctive data in the device before the relationship is determined;
    in the device, altering the audio alert with the distinctive data to generate an altered audio alert; and
    emitting the altered audio alert from the device,
    wherein the altered audio alert comprises a unique instantiation of the audio alert, and
    wherein the distinctive data includes at least a personal identifier associated with the source of the signal.

2. The method of claim 1, further comprising accessing the audio alert at a source external to the device before the relationship is determined, wherein the audio alert includes at least one member selected from a group comprising a melody, a performance, a ring tone, a song excerpt, and a digital recording.

3. The method of claim 1, further comprising accessing the distinctive data at a source external to the device before the relationship is determined.

4. The method of claim 3, the method further comprising:
    accessing the audio alert at a source external to the device before the relationship is determined;
    wherein accessing the audio alert comprises accessing at least one electronic file interpretable as audio;
    wherein accessing the distinctive data comprises accessing at least one electronic file containing data usable as the distinctive data; and
    wherein altering the audio alert with the distinctive data comprises generating an altered electronic file containing the distinctive data.

5. The method of claim 4, further comprising transmitting the altered electronic file to a second device for use at a distance.

6. The method of claim 1, wherein the distinctive data further includes at least one of the following:
    a digital voice recording of a person associated with the source of the signal; and
    a digital recording associated with the audio alert triggering event signal.

7. The method of claim 6, wherein altering the audio alert with the distinctive data comprises at least one of the following:
    modulating the audio alert with an ASCII string of the personal identifier;
    morphing the audio alert with the digital voice recording of the person;

combining the audio alert with a second audio alert;
recombining the altered audio alert with the distinctive data; and
modulating the audio alert with a digital recording.

8. The method of claim 7, wherein modulating the audio alert with an ASCII string of the personal identifier comprises at least one of the following:
adding two or more digits of the ASCII string and using the sum to modulate the audio alert;
subtracting two or more digits of the ASCII string and using the difference to modulate the audio alert;
dividing two or more digits of the ASCII string and using the result to modulate the audio alert; and
multiplying two or more digits of the ASCII string and using the product to modulate the audio alert.

9. The method of claim 6, wherein the digital voice recording comprises a voice recording of a caller to the device.

10. The method of claim 6, wherein the digital recording comprises a siren associated with an audio alert triggering event signal involving an emergency.

11. The method of claim 1, further comprising auditioning the altered audio alert.

12. The method of claim 1, wherein the personal identifier comprises at least one of the following:
a social security number;
a zip code;
an address;
an employee identification number;
a phone number;
a birth year; and
a birth date.

13. A computer program product comprising a tangible computer-readable medium having control logic stored therein for causing a processor to distinguish audio alerts, the control logic comprising computer-readable program code for causing the processor to:
in a device, detect receipt of an audio alert triggering event signal comprising an indication of a source of the signal;
responsive to the detecting, identify a predetermined relationship between distinctive data, an audio alert, and the source of the signal;
store the audio alert and the distinctive data in the device before the relationship is determined;
in the device, alter the audio alert with the distinctive data to generate an altered audio alert; and
emit the altered audio alert,
wherein the distinctive data includes at least a personal identifier associated with the source of the signal.

14. The computer program product of claim 13, further comprising computer-readable program code for causing the processor to access the audio alert at a source external to a device comprising the processor before the relationship is determined, wherein the audio alert includes at least one member selected from a group comprising a melody, a performance, a ring tone, a song excerpt, and a digital recording.

15. The computer program product of claim 13, wherein the distinctive data further includes at least one of the following:
a digital voice recording of the person; and
a digital recording associated with the audio alert triggering event signal;
wherein the personal identifier comprises at least one of the following:
a social security number;
a zip code;
an address;
an employee identification number;
a phone number;
a birth year; and
a birth date.

16. The computer program product of claim 15, wherein the computer-readable program code for causing the processor to alter the audio alert with the distinctive data comprises at least one of the following computer-readable program codes for causing the processor to:
modulate the audio alert with an ASCII string of the personal identifier;
morph the audio alert with the digital voice recording of the person;
combine the audio alert with a second audio alert;
recombine the altered audio alert with the distinctive data; and
modulate the audio alert with a digital recording.

17. A system for distinguishing an audio alert, comprising:
an audio source file for representing an audio alert;
a device having an emitter for emitting the audio alert and a modulated audio alert; and
a data structure operable to:
detect receipt of an audio alert triggering event signal comprising an indication of a source of the signal;
responsive to the detecting, identify a predetermined relationship between the audio source file, modulation data, and the source of the signal; and
cause the device to emit an altered audio source file;
a processor operable to calculate a modulation key based on the modulation data; and
a distinguisher operable to alter the audio source file with the modulation data in accordance with the modulation key.

18. The system of claim 17, wherein the device comprises storage for storing data and wherein the data structure comprises a data structure stored in the device.

19. The system of claim 17, wherein the audio source file comprises a sequence of numbers;
wherein each number of the sequence of numbers comprises a distinct musical tone; and
wherein an ASCII string of the modulation data comprises a second sequence of numbers modulating the sequence of numbers.

20. The system of claim 17, wherein the device comprises at least one of the following: a wireless telephone, a barcode scanner, a personal digital assistant, a global positioning system device, and an electronic mail messaging device.

* * * * *